United States Patent [19]

Bertoldo

[11] Patent Number: 5,288,087
[45] Date of Patent: Feb. 22, 1994

[54] SEAL FOR A COUPLING FOR PROTECTIVE TUBING FOR ELECTRICAL CABLES AND A COUPLING INCLUDING SUCH A SEAL

[75] Inventor: Piero Bertoldo, Balangero, Italy
[73] Assignee: Bertoldo & C. S. r. l., Italy
[21] Appl. No.: 888,542
[22] Filed: May 22, 1992
[30] Foreign Application Priority Data May 23, 1991 [IT] Italy .................. 91 A/000383

[51] Int. Cl.$^5$ .......... F16J 15/10; F16L 21/03
[52] U.S. Cl. ............ 277/207 A; 277/186; 277/205; 277/208; 277/212 F; 285/345; 285/369; 285/903; 285/910
[58] Field of Search ............ 277/207 A, 186, 205, 277/207 R, 208, 212 F; 285/331, 345, 369, 903, 910

[56] References Cited

U.S. PATENT DOCUMENTS

| | | | |
|---|---|---|---|
| 3,386,745 | 6/1968 | Hein | 277/205 |
| 3,575,430 | 4/1971 | Alpine | 277/207 A |
| 3,682,503 | 8/1972 | Bloom | 285/369 X |
| 3,857,589 | 12/1974 | Oostenbrink | 285/345 X |
| 4,293,138 | 10/1981 | Swantee | 277/207 A |
| 4,625,998 | 12/1986 | Draudt et al. | 285/903 X |
| 4,702,502 | 10/1987 | Shade et al. | 277/207 A X |
| 4,989,905 | 2/1991 | Rajecki | 285/903 X |
| 5,150,930 | 9/1992 | Petty et al. | 285/903 X |

FOREIGN PATENT DOCUMENTS

| | | | |
|---|---|---|---|
| 0853082 | 10/1970 | Canada | 285/369 |
| 1129344 | 5/1962 | Fed. Rep. of Germany | 271/207 A |
| 1220214 | 6/1966 | Fed. Rep. of Germany | 285/369 |
| 3605330 | 8/1987 | Fed. Rep. of Germany | 285/903 |
| 2123904 | 2/1984 | United Kingdom | 277/207 R |

Primary Examiner—William A. Cuchlinski, Jr.
Assistant Examiner—James K. Folker
Attorney, Agent, or Firm—Merchant, Gould, Smith, Edell, Welter & Schmidt

[57] ABSTRACT

The seal (4) has an annular body (10) with a generating section which is substantially rectangular and with an inner cylindrical surface (18) having a diameter (d1) substantially equal to the nominal diameter of the tubing (2) to be connected to the coupling (1). The seal (4) has a rib (20) projecting radially inwardly and having an inner diameter (d2) less than the outer diameter (d1) of the tubing. The seal also has an annular lip (24) which projects axially and has an inner surface with a diameter (d3) intermediate the internal diameter (d2) of the radial rib (20) and the diameter (d1) of the inner surface (18) of the seal (4).

13 Claims, 3 Drawing Sheets

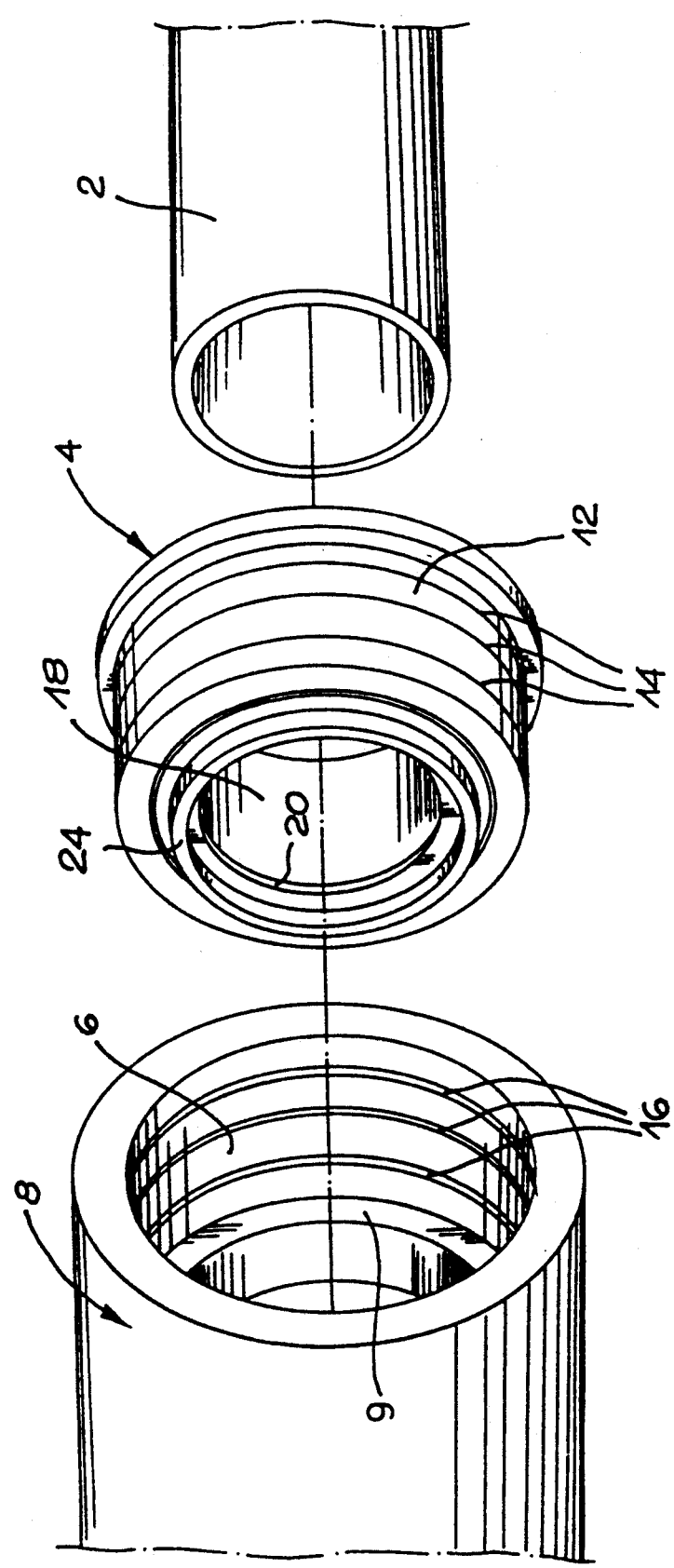

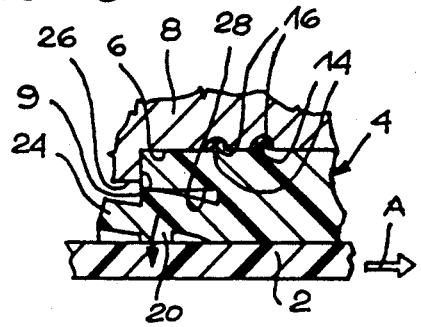
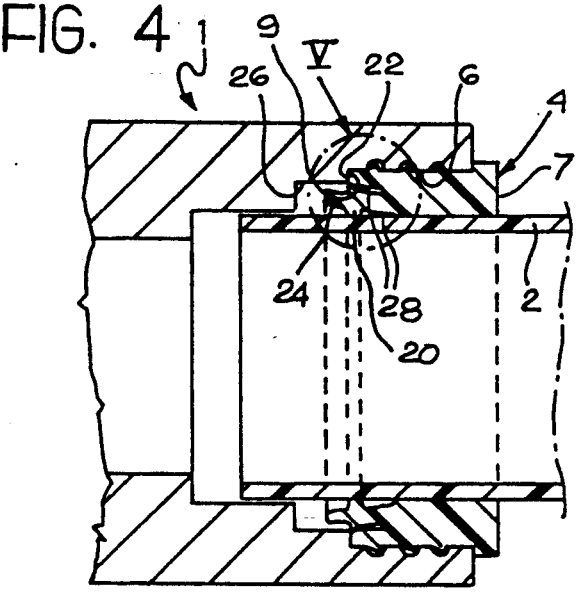
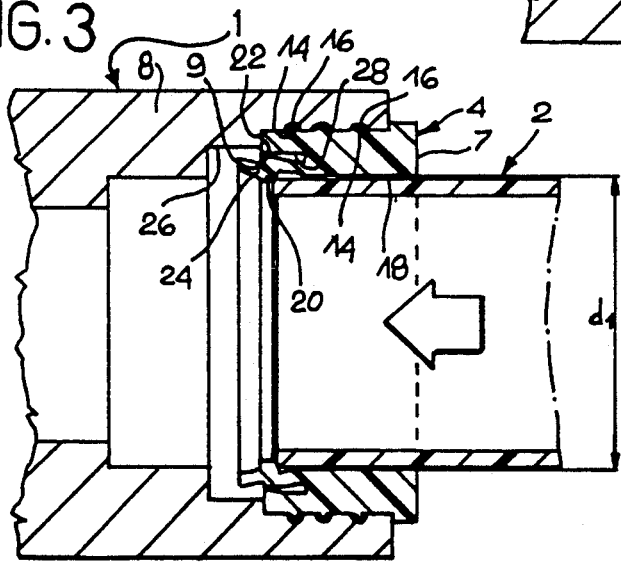
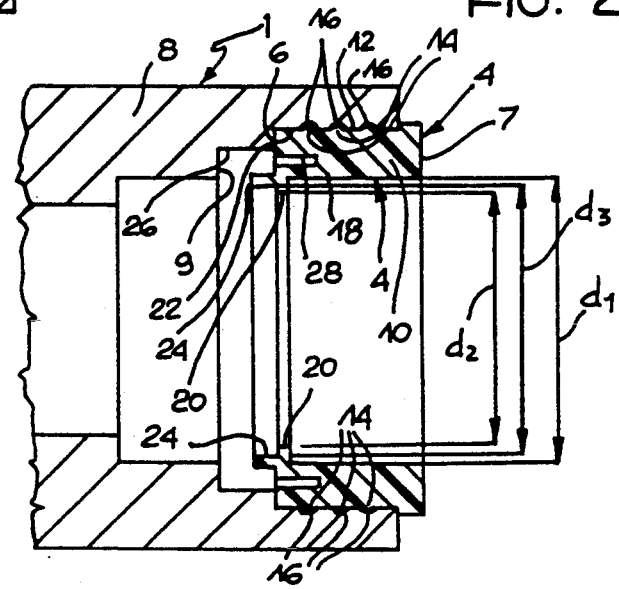

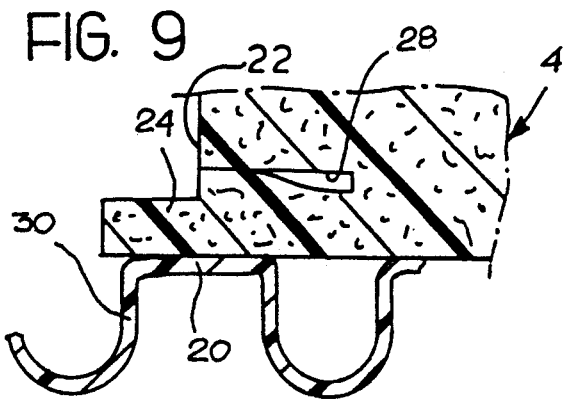
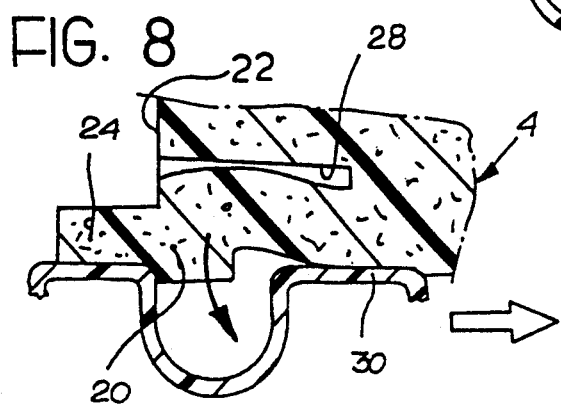
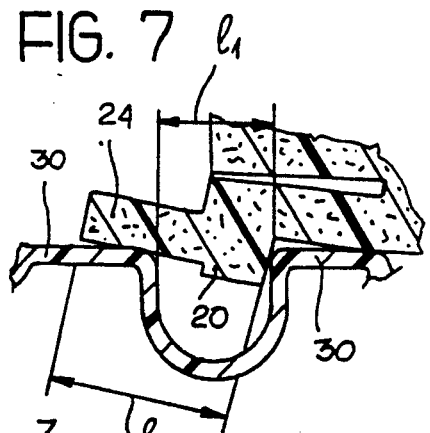
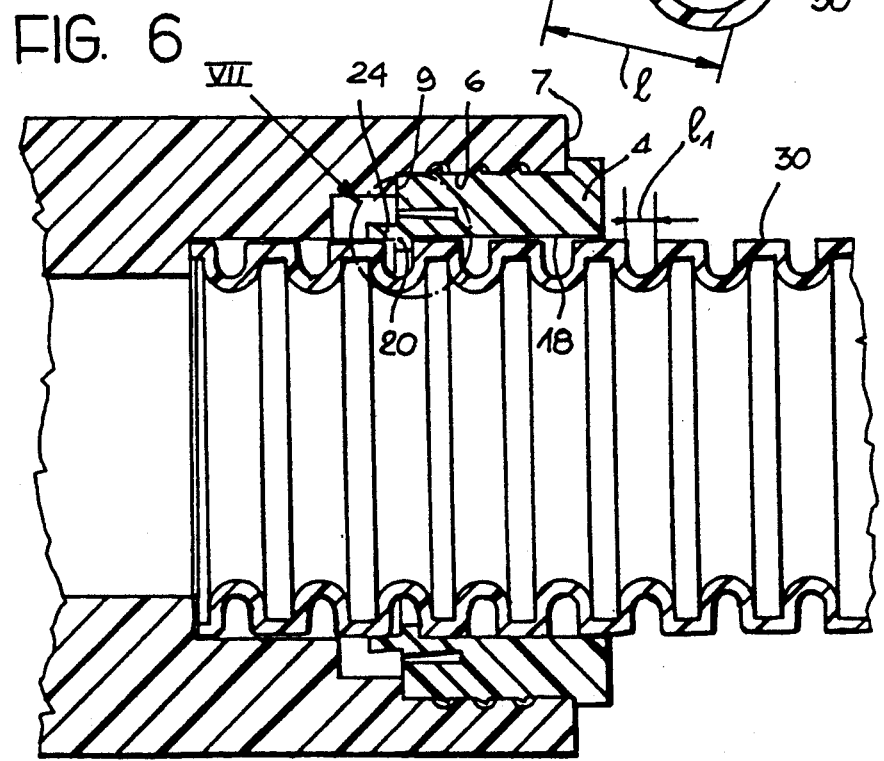

SEAL FOR A COUPLING FOR PROTECTIVE TUBING FOR ELECTRICAL CABLES AND A COUPLING INCLUDING SUCH A SEAL

DESCRIPTION

The present invention relates to a seal for a coupling for tubing for protecting electrical cables.

More precisely, the invention relates to a seal for establishing a liquid-tight contact with a protective tube to be connected to the coupling, the seal having an annular body whose generating section is substantially rectangular with an outer cylindrical surface which is intended to establish seal contact with a corresponding wall of a seat in a body element of the coupling.

Couplings for protective tubing are known in which the seal is compressed axially by the tightening of a ring nut after a tube has been inserted in the seal. The seal is then deformed against the outer surface of the tubing so as to create a sealing zone. The main disadvantage of this type of solution lies in the fact that the installation involves complicated operations since it is necessary to use tightening tools.

Solutions have already been proposed which allow the degree of sealing required by the regulatory standards to be achieved without the need to clamp the seal during installation. One example of this type of solution is described in the Applicants' Utility Model number IT 204170. This document discloses a coupling including two elements which clamp between them the radially outer portion of a seal whose inner diameter is less than the outer diameter of the tubing to be connected to the coupling. With this solution it suffices to fit the tube into the seal to achieve a firm, sealed connection between the coupling and the tube, without the need to tighten any ring nut.

The solutions known up till now are specifically intended for use either with smooth tubing or with corrugated tubing but do not ensure sufficient sealing when the coupling is to be used either with smooth or with corrugated protective tubing.

The object of the present invention is to provide a coupling which enables a sealed connection to be made both with smooth tubing and with corrugated tubing. A further object of the present invention is to provide a cheaper coupling which is even simpler to instal than known couplings.

According to the present invention, these objects are achieved by a seal of the type defined at the beginning, characterised in that the inner cylindrical surface of the seal has a diameter substantially equal to the nominal diameter of the tubing to be connected to the coupling and has a rib projecting radially inwardly of the seal whose inner diameter is less than the outer diameter of the tubing, the seal also having an axially projecting annular lip which has an inner surface with a diameter intermediate the inner diameter of the radial rib and the diameter of the inner surface of the seal.

The present invention also relates to a coupling including a seal having the said characteristics.

As will become clear from the description below, the lip of the seal enables a sealing surface to be created when the coupling is used with corrugated tubing while it is unaffected when the coupling is used with smooth tubing, in which case the sealing surface is constituted by the radial rib of the seal.

In addition to versatility in use, the seal of the present invention enables a coupling to be made with a simple, cheap structure. In fact, the coupling is constituted by a single body element and auxilarily elements are unnecessary to ensure the axial clamping of the seal to the body element of the coupling. The seat for the seal is also extremely simple and does not require an undercut profile which would make the insertion of the seal more complicated.

The coupling of the present invention may assume various forms such as, for example, elbows, tees, sleeves or may be integrated in a pull box or the like. The seal of the present invention may also be sold individually, without the body element of the coupling, since it can adapt itself to a hole previously made in the wall of a box, cubicle or the like, whatever the material this is made from.

Further characteristics and advantages of the present invention will become clear from the following detailed description, with reference to the appended drawings, provided purely by way of non-limiting example, in which:

FIG. 1 is an exploded perspective view of a coupling including a seal according the present invention;

FIG. 2 is an axial section of the coupling without the tubing inserted;

FIGS. 3 and 4 are axial sections corresponding to FIG. 2 and illustrating the behaviour of the seal during the insertion of the tubing;

FIG. 5 is a detail of the part indicated by the arrow V in FIG. 4;

FIG. 6 is a section of the coupling of FIG. 2 in which a corrugated tube is inserted, and FIGS. 7, 8 and 9 are views of the part indicated by the arrow VII in FIG. 6, on an enlarged scale, illustrating various relative positions of the tube and the seal.

With reference to FIGS. 1 and 2, a coupling for a protective tube 2 for electrical cables is indicated 1. The coupling 1 is constituted essentially by a seal 4 of elastic material (preferably of thermoplastic rubber or flexible PVC) inserted in a seat 6 formed in a body element 8 of moulded plastics material. The seat 6 is constituted by a cylindrical hole formed in the end face 7 of the body element 8 and terminating at an internal shoulder 9.

The seal 4 is constituted by an annular body 10 with a generating section of substantially rectangular form. The outer cylindrical surface 12 of the seal 4 has a series of radial projections 14 of saw tooth profile which fit into respective annular recesses 16 formed in the cylindrical wall of the seat 6. The outer diameter of the radial projections 14 is slightly greater than the diameter of the respective recesses 16 so as to create localised zones of sealing between the seal 4 and the seat 6. The radial projections 14 also have the purpose of preventing the seal 4 from coming out of its seat 6 accidentally before the tube 2 has been inserted. However, the ribs 14 are not strictly necessary for the sealing and axial retention of the seal in the seat 6. Tests carried out by the Applicant have shown that satisfactory results are obtained even with a seal 4 with a smooth outer profile 12. In this case, the surface which forms the seal between the seat 6 and the seal 4 is constituted by the entire cylindrical surface 12 while the axial retention is entrusted to the friction between the wall of the seat 6 and the surface 12.

The seal 4 has an inner cylindrical surface 18 with a diameter d1 substantially equal to the nominal diameter of the tubing to be connected to the coupling 1. The regulatory standards establish a defect tolerance on the nominal diameter for drawn plastic tubes. For example, for tubes with a nominal diameter d1 of 25 mm, a defect tolerance of 0.3 to 0.4 mm is allowed. This means that, when the tube is inserted in the seal 4, there is a slight clearance between the tube 2 and the seal 4 (see FIG. 3).

A radial rib 20 projects from the inner surface 18 of the seal 4 and is disposed in correspondence with the internal corner of the seal 4 and has a diameter d2 (FIG. 2) less than the diameter of the tubing to be connected to the coupling 1. By way of example, with d1=25 mm, d2 could be 22 mm.

A lip 24 projects axially from the inner end surface 22 of the seal 4 and has an inner surface with a diameter d3 between the inner diameter d2 of the radial rib 20 and the diameter d1 of the cylindrical surface 18 of the seal 4. Turning to the example above, with d1=25 mm and d2=22 mm, d3 could be 22.6 mm.

The body element 8 has a chamber 26 adjacent the seat 6 for the seal 4 having a cylindrical wall with a diameter intermediate the diameter of the tubing and that of the external surface 12 of the seal ring 4. As is seen in FIGS. 3 and 4, during the insertion of the tubing 2, the chamber 26 allows the inner part of the seal 4 to deform axially and this reduces the force needed for the insertion of the tubing. In order to reduce the force needed to insert the tubing even further, an axial annular groove 28 is formed in the inner end face 22 of the seal 4 which weakens the seal 4 in correspondence with the radial rib 20, facilitating the deformation of the seal during the insertion of the tube (see FIGS. 3 and 4).

When the tubing 2 is inserted in the seal 4, the rib 20 is pressed resiliently against the outer surface of the tubing 2 and forms a liquid-tight contact zone. The sealing zone thus obtained easily compensates for the tolerances in dimension and shape (ovalisation defect) of the tube 2.

The force needed to remove the tubing from the seal is much greater than the force needed to insert it. In fact as seen from FIG. 5, a movement of the tubing in the direction indicated by the arrow A tends to cause the rib 20 to jam and further increases the radial force with which the rib 20 is pressed against the surface of the tubing 2. The tube can, however, be removed easily from the seal 4 if it is rotated about its axis during the withdrawal movement.

In FIG. 6, the coupling 1 is connected to corrugated tubing 30. Again in this case, during the insertion of the tubing, the chamber 26 and the groove 28 allow the radial rib 20 to deform so that only a small force is needed to insert the tubing. As already stated above, the diameter of the inner surface of the lip 24 is less than the diameter d1 of the tubing 30 whereby the lip 24 is held in contact with the outer surface of the tube 30. In the configuration illustrated in FIGS. 6 and 7, the liquid-tight zone is located at the point of contact of the lip 24 with the surface of the tubing 30. In order to achieve the sealing contact between the lip 24 and the tubing 30, it is necessary for the dimension indicated by 1 in FIG. 7 to be greater than the width 11 of the grooves in the tubing 30.

FIG. 9 illustrates the configuration in which the rib 20 of the seal 4 is not inserted in a groove in the corrugated tubing 30. In this case the liquid-tight seal is formed by the annular area of contact between the rib 20 and the outer surface of the tubing 30.

The lip 24 also has the function of preventing the rib 20 from entering fully into a groove in the tubing 30 so as to make it very difficult to remove the tubing. FIG. 8 illustrates the behaviour of the seal if the tubing 30 is subjected to an axial force tending to remove it from the seal. The rib 20 tends to jam in a groove making it difficult to extract the tubing by an axial tractive force. If the tubing 30 is subjected to a combined tractive and rotational movement, however, it becomes possible to remove the tubing with a relatively small force although this is greater than the force needed to insert the tubing. If the height of the radial rib 20 is increased (thus reducing the diameter d2) it is possible to render the connection of a corrugated tubing irreleasable.

I claim:

1. A seal for a coupling for protective tubing for electrical cables, intended to establish liquid-tight contact with protective tubing (2, 30) having a nominal diameter to be connected to the coupling (1), the coupling (1) including a seat (6) in a body element (8) of the coupling (1), the seal (4) comprising: an annular body (10) with a generating section which is substantially rectangular, an outer cylindrical surface (12) intended to establish sealing contact with a corresponding wall of the seat (6) in the body element (8) of the coupling (1), an inner cylindrical surface (18) of the seal (4) extending from an open end of the seal (4) and having a diameter (d1) substantially equal to the nominal diameter of the tubing (2, 30) to be connected to the coupling (1), a rib (20) projecting radially inwardly of the seal (4) whose inner diameter (d2) is less than the outer diameter of the tubing (2, 30), and an axially projecting annular lip (24) which has an inner surface with a diameter (d3) intermediate the inner diameter (d2) of the radial rib (20) and the diameter (d1) of the inner cylindrical surface (18) of the seal (4), wherein the diameter (d3) of the inner surface of the lip (24) defines the minimum inner diameter of the lip (24).

2. A seal according to claim 1, wherein the lip (24) projects axially from an inner end face (22) of the seal (4).

3. A seal according to claim 2, wherein the axial distance (1) between an end of the lip (24) and a radial surface of the rib (20) which faces in the opposite direction from that in which the tubing (2,30) is inserted is greater than the axial length (11) of the annular grooves in a corrugated tubing (30) to be connected to the coupling (1).

4. A seal according to claim 1, further comprising an annular groove (28) extending axially in inner end face (22) of the seal (4) and surrounding that region of the seal carrying the rib (20).

5. A seal according to claim 1, further comprising a plurality of radial projections (14) of saw-tooth profile formed on the outer cylindrical surface (12) of the seal (4).

6. A coupling for tubes for protecting electrical cables, comprising:
a body element (8) having a seat (6); and
a seal disposed in the seat (6) and including an annular body (10) with a generating section which is substantially rectangular, an outer cylindrical surface (12) intended to establish sealing contact with a corresponding wall of the seat (6) in the body element (8), an inner cylindrical surface (18) of the seal (4) extending from an open end of the seal (4) and having a diameter (d1) substantially equal to a nominal outside diameter of the tubing (2,30) to be connected to the coupling, a rib (20) projecting radially inwardly of the seal (4) whose inner diameter (d2) is less than the outer diameter of the tubing (2,30), and an annular lip (24) which has an inner surface with a diameter (d3) intermediate the inner diameter (d2) of the radial rib (20) and the diameter (d1) of the inner cylindrical surface (18) of the seal (4), wherein the diameter (d3) of the lip (24) defines the minimum inner diameter of the lip (24).

7. A coupling according to claim 6, wherein the seat (6) is constituted by a cylindrical hole formed in an end face of the body element (8) and in the bottom of which is formed a shoulder against which bears a radially outer portion of an inner end face (12) of the seal (4).

8. A coupling according to claim 7, wherein the seal (4) includes a plurality of radial projections (14) of saw tooth profile formed on the outer cylindrical surface (12) of the seal (4) and wherein the seat (6) has a cylindrical wall having a plurality of annular recesses (16) for receiving the respective radial projections (14) of the seal (4), the recesses having a diameter slightly less than the outer diameter of the respective radial projections (14).

9. A coupling according to claim 7, wherein the body element (8) includes a chamber (26) adjacent the seat (6) for allowing deformation of the radial rib (20) along the axis of the seal (4) during insertion of the tubing.

10. A coupling according to claim 6, wherein the lip (24) projects axially from an inner end face (22) of the seal (4).

11. A coupling according to claim 10, wherein the axial distance (1) between an end of the lip (24) and a radial surface of the rib (20) which faces in the opposite direction from that in which the tubing (2,30) is inserted is greater than the axial length (11) of the annular grooves in a corrugated tubing (30) to be connected to the coupling (1).

12. A coupling according to claim 6, further comprising an annular groove (28) extending axially in an inner end face (22) of the seal (4) and surrounding that region of the seal carrying the rib (20).

13. A coupling according to claim 6, further comprising a plurality of radial projections (14) of saw-tooth profile formed on the outer cylindrical surface (12) of the seal (4).

* * * * *